United States Patent
Armstrong

(10) Patent No.: US 10,443,938 B2
(45) Date of Patent: Oct. 15, 2019

(54) RETROFIT MOISTURE AND HUMIDITY SENSOR AND AUTOMATIC SHUTOFF DEVICE FOR CLOTHES DRYERS

(75) Inventor: Malcolm Clare Charles Armstrong, Brockville (CA)

(73) Assignee: GA INNOVATION, LLC, Richmond, VT (US)

( * ) Notice: Subject to any disclaimer, the term of this patent is extended or adjusted under 35 U.S.C. 154(b) by 1342 days.

(21) Appl. No.: 12/941,163

(22) Filed: Feb. 13, 2011

(65) Prior Publication Data

US 2011/0203131 A1   Aug. 25, 2011

(51) Int. Cl.
*F26B 19/00* (2006.01)
*F26B 21/08* (2006.01)
*D06F 58/28* (2006.01)

(52) U.S. Cl.
CPC .............. *F26B 21/08* (2013.01); *D06F 58/28* (2013.01); *D06F 2058/2819* (2013.01); *D06F 2058/2838* (2013.01)

(58) Field of Classification Search
CPC ....................................................... D06F 58/28
USPC ......................................................... 34/572
See application file for complete search history.

(56) References Cited

U.S. PATENT DOCUMENTS

| 5,486,815 A * | 1/1996 | Wagner | 340/602 |
| 6,784,673 B2 * | 8/2004 | Tomasi et al. | 324/664 |
| 7,403,126 B2 * | 7/2008 | Pedraza et al. | 340/604 |
| 7,454,269 B1 * | 11/2008 | Dushane et al. | 700/276 |
| 2004/0088796 A1 * | 5/2004 | Neergaard | A47L 15/4454 8/158 |
| 2004/0187341 A1 * | 9/2004 | Studd et al. | 34/402 |
| 2006/0185187 A1 * | 8/2006 | Kou | 34/282 |
| 2006/0248946 A1 * | 11/2006 | Howell et al. | 73/73 |
| 2007/0247134 A1 * | 10/2007 | Ryan et al. | 323/318 |
| 2008/0052954 A1 * | 3/2008 | Beaulac | 34/572 |
| 2008/0072448 A1 * | 3/2008 | Hubig et al. | 34/446 |
| 2008/0088462 A1 * | 4/2008 | Breed | 340/573.1 |
| 2008/0104856 A1 * | 5/2008 | Armstrong | 34/60 |
| 2008/0184588 A1 * | 8/2008 | Somod et al. | 34/495 |
| 2008/0238643 A1 * | 10/2008 | Malen | 340/438 |

FOREIGN PATENT DOCUMENTS

CN        1818565 A  *  8/2006

* cited by examiner

*Primary Examiner* — Jason Lau
(74) *Attorney, Agent, or Firm* — Justin W. McCabe, Esq.; Shawn Gordon, Esq.; Dunkiel Saunders Elliott Raubvogel & Hand, PLLC

(57) ABSTRACT

The present invention provides a retrofit device to automatically shut off a clothes dryer to prevent over drying. The device includes a humidity sensor apparatus for placement inside a clothes dryer. The Sensor communicates with a Receiver device connected to an electrical wall outlet and to the electrical plug of the clothes dryer. The Receiver turns off the power to the clothes dryer when the humidity level in the clothes dryer drops to a predetermined level, as detected by the Sensor.

1 Claim, 2 Drawing Sheets

RETROFIT MOISTURE AND HUMIDITY SENSOR AND AUTOMATIC SHUTOFF DEVICE FOR CLOTHES DRYERS

TECHNICAL FIELD

The technical field of the invention relates to an apparatus and methods for reducing energy consumption for gas and electric domestic or industrial clothes dryers. This invention is applicable to new and old clothes dryers, even clothes dryers that have a moisture sensor built-in because this invention also measures the humidity. The concept prevents over-drying as well as reducing unnecessary energy consumption. At the time of writing this application there are no clothes that measure the humidity. Measuring the humidity is a far more accurate way to detect whether the items in the dyer are in fact dry. This invention works by placing a detachable/portable moisture/humidity detecting apparatus inside or unto the drum or back of the inside of the clothes dryer which serves to remotely communicate to a small Receiver device. The Receiver is directly plugged into the 120V outlet and the clothes dryer is plugged into the Receiver. When the level of humidity is reaches zero in the clothes dryer the Sensor wirelessly communicates to the Receiver which then cuts the power to the clothes dryer.

BACKGROUND OF THE INVENTION

Currently there are clothes dryers in the market that have built-in moisture sensor(s), unfortunately, only high-end dryers have this option. Without having to spend an extra $100-200 for a built-in moisture sensor dyer, the advantage of this invention (Retrofit Moisture and Humidity Sensor and Automatic Shutoff device for Clothes Dryers), is that it can be installed to any clothes dryer without the need of a technician to install it.

As is well known, a typical clothes dryer is a large appliance for drying clothes, bedding, towels, and other linens. Moisture is removed from clothes by a combination of air, heat, and motion. Gas and electric dyers differ mainly in the heat source. Both gas and electric models use a motor to turn a drive belt. The drive belt revolves the drum which holds the clothing. A blower directs air past the heat source and into the drum where it draws lint and moisture from the fabrics through a lint screen and out an exhaust duct. Appliance controls regulate the options, such as temperature and drying time. Some machines use mechanical timers while others rely on digital electronics. Clothes dryers constitute one of the most energy intensive appliances. However, even with the advancement of technology, clothes dryers are one of the few appliances that have not demonstrated significant reduction of energy consumption. One significant waist of energy caused by clothes dryers is over drying.

According to the report on "Residential Consumption of Electricity by End Use, 2001" produced by the Energy Information Administration, clothes dryers in the United States used 65.9 billion kWh. Note that this number does not take into account the energy used by commercial clothes dryers (e.g., Laundromats, Hotels, Prisons, Hospitals, etc.). In comparison to clothes washers, "energy consumption does not vary significantly among comparable models of clothes dryers." See Worldwise, at the web page: http://www.worldwise.com/clothesdryers.html. Consequently, "ENERGY STAR does not label Clothes Dryers because most Clothes Dryers use similar amounts of energy." See Energy Star, at the web page: http://www.energystar.gov/index.cfm?c=clotheswash.pr_clothes_washers. Given the need to reduce energy consumption in clothes dryers this invention, Retrofit Moisture and Humidity Sensor and Automatic Shutoff Device for Clothes Dryers is being proposed. Also, the majority of clothes dryers in households today are older dryers and therefore do not have Moisture Sensor technology since this technology is relatively new (i.e., within the last five years).

This invention is believed to be useful in meeting the growing demand by both power companies and government agencies to reduce energy use. Further, it should be noted that the effectiveness of Retrofit Moisture and Humidity Sensor and Automatic Shutoff Device for Clothes Dryers is not limited to electric powered clothes dryers, but is also applicable to clothes dryers operated by either natural gas or propane gas.

Below is a list of several government agencies and nongovernmental organizations (NGOs) that would likely value the benefits of Retrofit Moisture and Humidity Sensor and Automatic Shutoff Device for Clothes Dryers: This list is not exhaustive.
  a. U.S. Department of Energy
  b. American Council for an Energy-Efficient Economy
  c. Appliance Standards Awareness Project
  d. International Energy Agency
  e. Energy Efficient Strategies
  f. Energy Federation Incorporated
  g. Energy Star
  h. Energy Efficiency Form
  i. Natural Resources Defense Council
  j. International Electrotechnical Commission
  k. Alliance to Save Energy
  l. American Council for an Energy Efficient Economy
  m. California Institute for Energy Efficiency
  n. Office of Energy Efficiency and Renewable Energy

BRIEF SUMMARY OF THE INVENTION

Newer and more expensive clothes dryers have a built-in Moisture/Humidity Sensor to detect when the items are dry. Once the Sensor detects that the items are dry it shuts the dryer off. This feature conserves a considerable amount of energy by preventing over drying. The Moisture Sensor in clothes dryers is comprised of several metal strips that is usually located below the lint collector. Some clothes dryers have more than one sensor. At the time of writing this application no clothes dryer measures the humidity inside the clothes dryer. Those clothes dryers that do have a build-in sensor only measure the moisture. Measuring the humidity is far more accurate than simply measuring the moisture which thereby increases the accuracy of detecting when the items are actually dry. Therefore, this invention can be also be used with clothes dryers with existing moisture sensors.

This invention, Retrofit Moisture and Humidity Sensor and Automatic Shutoff device for Clothes Dryers, is comprised of three devices: (1) a portable Moisture/Humidity Sensor; (2) a Receiver that cuts the power to the clothes dryer; and (3) a on/off switch that is attached from the Receiver which runs to the front of the clothes dryer.

The Moisture/Humidity Sensor is what detects the level of the moisture and humidity of the items inside the clothes dryer. The Moisture/Humidity Sensor has a built-in wireless device to communicate to the Receiver. The Moisture/Humidity Sensor device can be magnetically attached to the drum of the clothes dryer or anywhere inside the clothes dryer (e.g., on the inside door or the back of the inside of the clothes dryer). The Moisture/Humidity Sensor may also be placed along with the items in the clothes dryer in the same way one could place a tennis ball inside a clothes dryer.

The Moisture/Humidity Sensor may either be attached magnetically to the inside of the clothes dryer and/or the Moisture/Humidity Sensor can be in the shape of a ball and freely move inside the clothes dryer as opposed to being magnetically attached to the inside of the clothes dryer.

The Moisture/Humidity Sensor is battery powered and has a flashing LED light to indicate that it is working.

The Moisture/Humidity Sensor is insulated to protect the battery from the heat of the dryer.

The Moisture/Humidity Sensor has different levels of dryness to choose from. There is a switch on the Moisture/Humidity Sensor apparatus that allows for this option.

The Moisture/Humidity Sensor has an on/off switch to conserve its battery life or if the user does not want to use the Moisture/Humidity Sensor.

When not in use the Moisture/Humidity Sensor will shut-off automatically after a certain time.

The Receiver is plugged into the 120V electrical outlet. The clothes dryer is then plugged into the Receiver. The Receiver is a small box (approx. 6 inches by 6 inches). The Receiver has the ability to cut the power to the clothes dryer similar to how a timer is able to cut the power to a table lamp.

For those clothes dryers that are gas powered the Receiver would be constructed in a different manner.

A 6 ft wire is attached to the Receiver which has a power on/off switch that can serve as means to override the Receiver's ability to turn the power on or off. Due to the fact that most electrical outlets for clothes dryers are not easily accessible then neither will the Receiver be easily accessible since it is plugged into the 120V electrical outlet. This 6 ft wire with its power on/off switch can be magnetically attached to the outside front or on the side of the clothes dryer. This on/off switch can also serve the purpose of turning the power back on so a new load of laundry can be placed in the clothes dryer.

If a user does not want to use the Moisture/Humidity Sensor device then the user can the Moisture/Humidity Sensor from the clothes dryer and turn it off. As a result of the Moisture/Humidity Sensor, items in a clothes dryer will not be over-dried. Furthermore, energy will be conserved due to the prevention of over drying.

The invention may provide one or more of the following advantages (a) reusable; (b) portable/detachable (i.e., the product can be easily removed and used on another clothes dryer; (c) versatile (i.e., can be used in most clothes dryer); (d) inexpensive to buy; (e) saves wear-and-tear on clothes dryers due to less drying time; (f) less wear-and-tear on clothes by preventing over-drying; (g) reduction in greenhouse gas emissions as less drying time means less energy required; (h) does not require a technician to install it.

DETAILED DESCRIPTION OF THE INVENTION

This invention uses existing moisture sensing technology that is currently available in some newer clothes dryers that have a built-in Moisture Sensor.

This invention has the added advantage by not only detecting the moisture but also the humidity. This a far more accurate means of determining when items are dry and thereby conserve more energy.

The Moisture/Humidity Sensor is portable and thus allowing the Moisture/Humidity Sensor to be used in any clothes dryer.

Like existing Moisture Sensors, the Moisture/Humidity Sensor for this invention will be able to detect and gage the level of moisture and humidity of particular items being dried in a clothes dryer.

Figure 1:
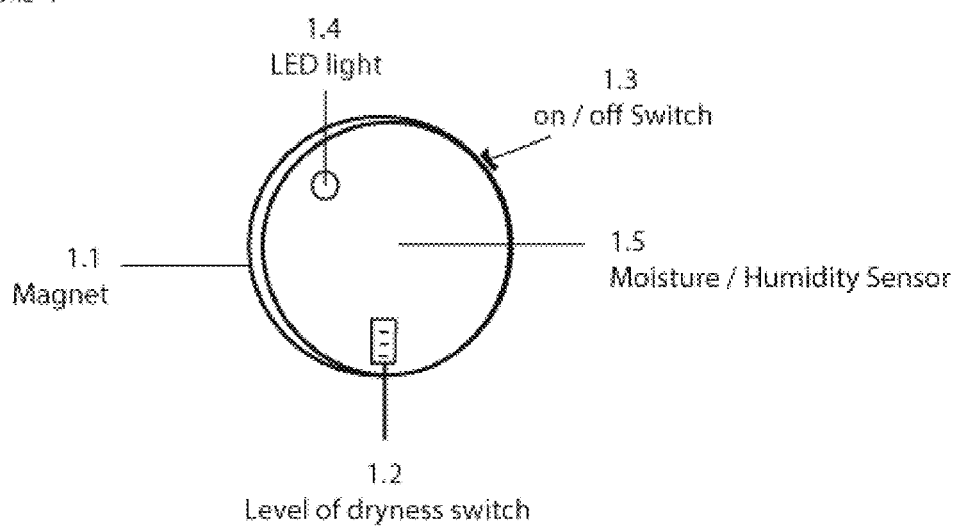
FIG. 1 is a perspective view of the Sensor. The Sensor is made of five parts: (1.1) magnet, (1.2) level of dryness switch, (1.3) on/off switch, (1.4) LED light, and (1.5) moisture/humidity detector.
Figure 2:
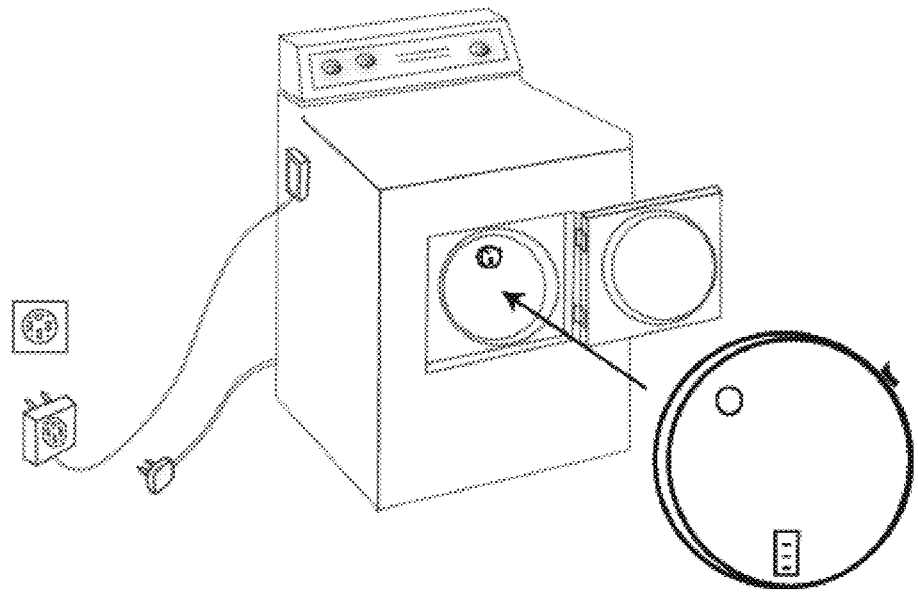
FIG. 2 is a perspective view of where the Sensor is placed in the clothes dryer.

The Sensor is shown in FIG. 1. It is composed of five parts. (1.1) magnet, (1.2) level of dryness switch, (1.3) on/off switch, (1.4) LED light, and (1.5) moisture/humidity detector. The magnetic allows the Sensor to be attached anywhere in the clothes dryer (see FIG. 2). The level of dryness switch allows the user to choose the level of dryness.

What makes the Moisture/Humidity Sensor unique is that it communicates wirelessly to a Receiver which in-turn can cuts the power to the clothes dryer once the items in the dryer are dry.

Figure 3:
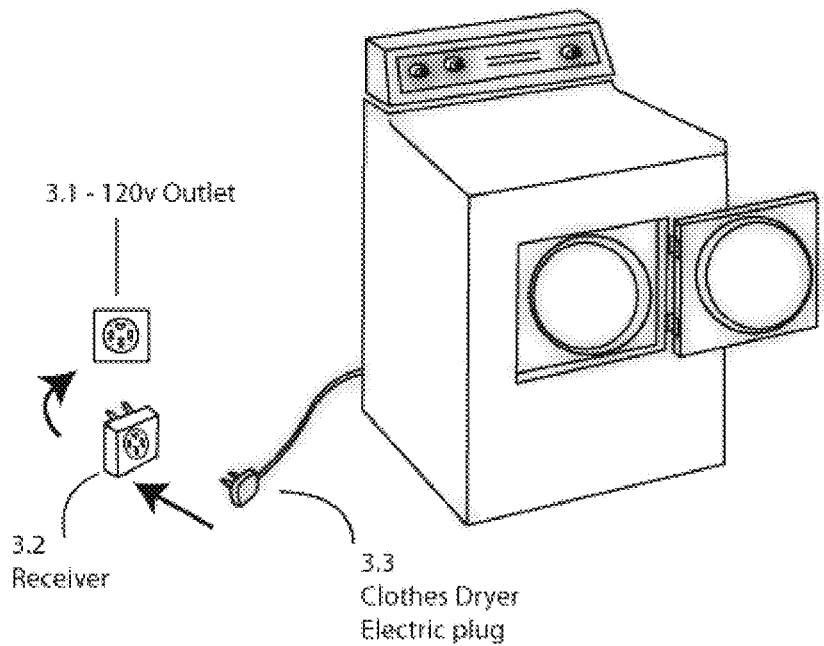
FIG. 3. is a perspective view of the Receiver. In particular, a view of the Receiver being plugged into a 120V wall socket and the clothes dryer electric plug being plugged into the Receiver.

Referring to FIG. 3, the clothes dryer electric code (3.3) is plugged into the Receiver (3.2) which is plugged into the 120V outlet (3.1). The Receiver serves the purpose of cutting the power to the clothes dryer once the Moisture/Humidity Sensor detects the items in the clothes dryer are dry.

Moisture Sensors that are already built into clothes dryers normally have a rectangular shape, however, the Moisture/Humidity Sensor for this invention is not limited to being rectangular.

There can be more than one Moisture/Humidity Sensor used during any given load of items being dried in the clothes dryer.

Figure 4:
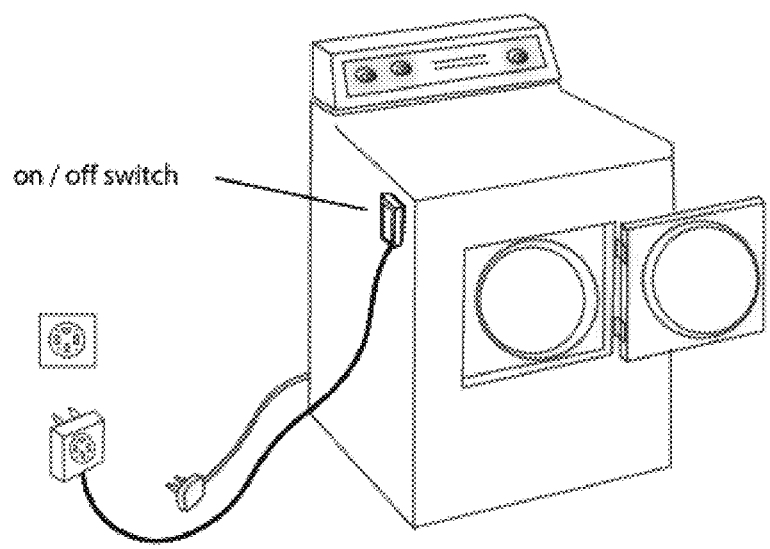
FIG. 4. is a perspective view of the on/off switch for the Receiver.

Since the Receiver will be located wherever the 120V outlet is (which is normally behind the clothes dryer), the Receiver will be difficult to reach. In order to override the Receiver and to reinstate the power to the clothes dryer a convenient switch must be devised (see FIG. 4). Thus, a 6 ft wire will run from the Receiver to an on/off switch. The switch will have a small magnet attached to it so the user can place the switch on the clothes dryer wherever is convenient. Once the Receiver cuts the power to the clothes dryer, the on/off switch will be used to turn the power back on.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention.

What is claimed is:

1. An automatic shutoff device for a clothes dryer, the device consisting of:
   a reusable portable sensor device being removably placeable inside a drum of the clothes dryer by a user of the clothes dryer, wherein the sensor device is not secured to an interior surface of the drum or a door of the clothes dryer and as such moves freely within the drum during a drying cycle in the clothes dryer, the sensor device comprising:
      a sensor for detecting a humidity level in the clothes dryer,
      a communication device, and
      a power source in electrical contact with the communication device; and
   a receiver device operable to reversibly interrupt a flow of electrical power between the dryer and an external electrical power source when the receiver device is in electrical contact with a power cord of the dryer and with the external electrical power source, the receiver device being configured to receive a signal from the communication device of the sensor device;
   wherein when the clothes dryer is in use and the humidity level therein is reduced to a predetermined humidity level, the communication device sends the signal to the receiver to interrupt the flow of electrical power from the external electrical power source to the dryer.

* * * * *